US010600404B2

(12) United States Patent
Garcia

(10) Patent No.: US 10,600,404 B2
(45) Date of Patent: Mar. 24, 2020

(54) AUTOMATIC SPEECH IMITATION

(71) Applicant: Intel Corporation, Santa Clara, CA (US)

(72) Inventor: Jason Garcia, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 106 days.

(21) Appl. No.: 15/826,149

(22) Filed: Nov. 29, 2017

(65) Prior Publication Data

US 2019/0043472 A1 Feb. 7, 2019

(51) Int. Cl.

*G10L 13/027* (2013.01)
*G10L 13/10* (2013.01)
*G10L 13/047* (2013.01)
*G10L 21/003* (2013.01)
*G10L 13/033* (2013.01)
*G06F 17/27* (2006.01)
*G10L 15/22* (2006.01)
*G06F 3/0482* (2013.01)

(52) U.S. Cl.

CPC .......... *G10L 13/027* (2013.01); *G10L 13/033* (2013.01); *G10L 13/047* (2013.01); *G10L 13/10* (2013.01); *G10L 21/003* (2013.01); *G06F 3/0482* (2013.01); *G06F 17/2705* (2013.01); *G10L 15/22* (2013.01); *G10L 2015/223* (2013.01)

(58) Field of Classification Search

CPC ..... G10L 13/027; G10L 13/033; G10L 13/08; G06F 17/279

See application file for complete search history.

(56) References Cited

U.S. PATENT DOCUMENTS

| | | | | |
|---|---|---|---|---|
| 8,972,265 | B1 * | 3/2015 | Lester | G10L 13/00 704/246 |
| 9,324,318 | B1 * | 4/2016 | Bunn | G10L 21/003 |
| 2002/0161882 | A1 * | 10/2002 | Chatani | A63F 13/12 709/224 |
| 2003/0028380 | A1 * | 2/2003 | Freeland | G10L 13/00 704/260 |
| 2003/0078780 | A1 * | 4/2003 | Kochanski | G10L 13/10 704/258 |
| 2004/0059577 | A1 * | 3/2004 | Pickering | G10L 13/08 704/260 |
| 2004/0148172 | A1 * | 7/2004 | Cohen | G10L 15/26 704/268 |
| 2005/0065795 | A1 * | 3/2005 | Mutsuno | G10L 13/033 704/260 |

(Continued)

*Primary Examiner* — Brian L Albertalli
(74) *Attorney, Agent, or Firm* — Jordan IP Law, LLC

(57) ABSTRACT

Embodiments of systems, apparatuses, and/or methods are disclosed for automatic speech imitation. An apparatus may include a machine learner to perform an analysis of tagged data that is to be generated based on a speech pattern and/or a speech context behavior in media content. The machine learner may further generate, based on the analysis, a trained speech model that is to be applied to the media content to transform speech data to mimic data. The apparatus may further include a data analyzer to perform an analysis of the speech pattern, the speech context behavior, and/or the tagged data. The data analyzer may further generate, based on the analysis, a programmed speech rule that is to be applied to transform the speech data to the mimic data.

25 Claims, 5 Drawing Sheets

(56) References Cited

U.S. PATENT DOCUMENTS

2008/0183473 A1* 7/2008 Nagano .................. G10L 13/07 704/258
2008/0319752 A1* 12/2008 Kuo ..................... G10L 13/047 704/258
2009/0037179 A1* 2/2009 Liu ...................... G10L 13/033 704/260
2010/0042410 A1* 2/2010 Stephens, Jr. .......... G10L 13/10 704/260
2013/0289998 A1* 10/2013 Eller ...................... G10L 13/08 704/260
2016/0365087 A1* 12/2016 Freud ..................... G10L 13/10
2018/0133900 A1* 5/2018 Breazeal .............. B25J 11/0005
2018/0182373 A1* 6/2018 Almudafar-Depeyrot .................. G10L 13/00
2019/0043474 A1* 2/2019 Kingsbury .............. G10L 13/10

* cited by examiner

AUTOMATIC SPEECH IMITATION

TECHNICAL FIELD

Embodiments generally relate to speech imitation. More particularly, embodiments relate to devices and/or methods to automatically imitate/replicate speech.

BACKGROUND

Artificial intelligence (AI) platforms and intelligent personal assistants may not be capable of imitating speech. Although voice tonality might be trained, an effective overall usage of complex and/or unique speech patterns may not be available. Indeed, conventional AI platforms and intelligent personal assistants utilize a single personality with a standard or typical speech pattern for an applicable language. For example, a monotone personality is used that is based on a speech pattern supported for a given language. AI platforms and intelligent personal assistants, therefore, lack human or fictional personality that is unique or interesting. Meanwhile, realistic mimicking of more complex patterns or behaviors consists of performances by actors in specialized theaters to manually control speech in real-time. Thus, user experience and/or accessibility remain as obstacles in conventional AI and personal assistant approaches.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
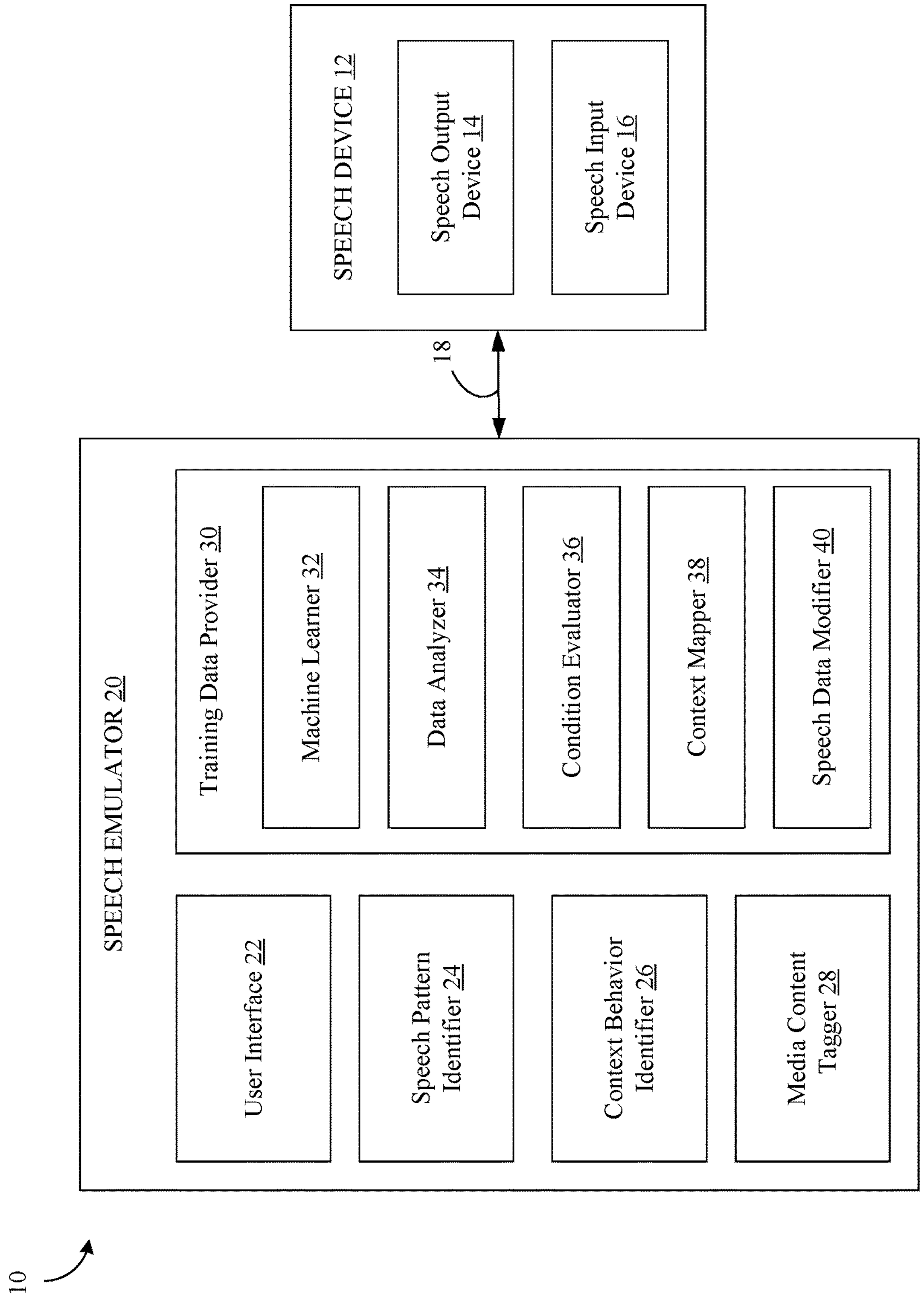
FIG. 1 is a block diagram of an example of a speech imitation system to imitate speech according to an embodiment.

FIG. 1 illustrates a speech imitation system 10 to imitate speech which may include a computing platform such as, for example, a desktop computer, a notebook computer, a tablet computer, a convertible tablet, a personal digital assistant (PDA), a mobile Internet device (MID), a media player, a smart phone, a smart televisions (TV), a radio, a wearable device (e.g., smart watch), a vehicle infotainment system, a vehicle navigation system, a gaming console, and so on. Notably, the speech imitation system 10 provides for an effective overall usage of complex and unique speech patterns and/or context speech behaviors involving, for example, speech pattern variation (e.g., stuttering, word repetition, dramatic pauses, exaggerated inflections, speaking in $3^{rd}$ person, etc.), speech phrasing (e.g., cultural, regional, family, and/or character specific sayings, terminology, expressions, etc.), speech adjustment (e.g., sound effects, fillers, intermingling of multiple languages, etc.), triggers (e.g., environment, emotion, etc.), and so on. As discussed in detail below, the speech imitation system 10 may generate imitated speech that more closely resembles speech by people encountered on a daily basis, speech from a particular geographic region, speech from a particular socio-economic background, speech from a historical figure, speech from a celebrity, etc.

The speech imitation system 10 includes a speech device 12 including a speech output device 14 such as, for example, a speaker that renders audio speech, a mechanical tactile device that renders tactile speech (e.g., text-to-brail, etc.), and/or a display that renders visual speech (e.g., captions, etc.). In one example, the display includes a liquid crystal display (LCD), a light-emitting diode display (LED), and organic LED display (OLED), a projection display, a virtual reality (VR) display, an augmented reality (AR) display, and so on. Additionally, the speech device 12 includes a speech input device 16 such as, for example, a microphone that receives audio speech, a mechanical tactile device that receives tactile speech (e.g., brail-to-text, etc.), and/or a display (e.g., a touch screen, etc.) that receives visual speech. Moreover, the speech input device 16 may include an image capture device to receive visual speech such as, for example, sign language, mouth movements, and so on. Accordingly, the image capture device may include an integrated camera of a computing platform, a front-facing camera, a rear-facing camera, a rotating camera, a two-dimensional (2D) camera, a three-dimensional (3D) camera, a standalone camera (e.g., a wall mounted camera), an infrared camera, and so on. In one example, the speech device 12 includes an intelligent personal assistant device capable of accepting audio speech (e.g., questions, commands, etc.) and automatically rendering audio output in response to the audio speech (e.g., answers to questions, content in response to commands, etc.).

The speech device 12 is communicatively coupled via a communication channel 18 with a speech emulator 20 to imitate speech. The communication channel 18 may provide communication functionality including, for example, NVMe (NVM Express) over Peripheral Components Interconnect Express, (e.g., Peripheral Components Interconnect/PCI Express Specification 3.0, PCI Special Interest Group), Serial Advanced Technology Attachment (e.g., SATA 3.2, published in February 2016), SAS (Serial Attached SCSI/Small Computer System Interface) (e.g., SAS-3, published March 2013), Advance Microcontroller Bus Architecture (AMBA 5, published Jul. 12, 2013) and so on. The communication channel 18 may also provide communication functionality including, for example, cellular telephone (e.g., Wideband Code Division Multiple Access/W-CDMA (Universal Mobile Telecommunications System/UMTS), CDMA2000 (IS-856/IS-2000), etc.), WiFi (Wireless Fidelity, e.g., Institute of Electrical and Electronics Engineers/IEEE 802.11-2007, Wireless Local Area Network/LAN Medium Access Control (MAC) and Physical Layer (PHY) Specifications), LiFi (Light Fidelity, e.g., IEEE 802.15-7, Wireless Local Area Network/LAN Medium Access Control (MAC) and Physical Layer (PHY) Specifications), 4G LTE (Fourth Generation Long Term Evolution), Bluetooth (e.g., IEEE 802.15.1-2005, Wireless Personal Area Networks), WiMax (e.g., IEEE 802.16-2004, LAN/MAN Broadband Wireless LANS), Global Positioning System (GPS), spread spectrum (e.g., 900 MHz), NFC (Near Field Communication, ECMA-340, ISO/IEC 18092), and other radio frequency (RF) purposes.

In the illustrated example, the speech emulator 20 includes a user interface 22 (e.g., a graphical user interface (GUI), a command line interface, an audio interface, etc.) that may receive input from an input/output (I/O) device such as, for example, a mouse, a keyboard, a display, a microphone, a camera, etc. The user interface 22 may allow for the modification of media content such as, for example, audio artificial intelligence (AI) content, game content, educational content, social application content, text content, video content, etc. In one example, the user interface 22 may allow for text content that has been transformed/transcribed from audio content and/or video content to be modified with speech identification information (e.g., speech pattern identifiers, speech context behavior identifiers, etc.). In one example, the text content may be rendered in a markup language format such as hypertext markup language (HTML), extensible markup language (XML), speech synthesis markup language (SSML), and so on.

The user interface 22 may also allow a configurable value to be set for properly imitating speech. The user interface 22 may, for example, provide a modifiable field (e.g., a drop-down menu, a click menu, etc.) that might be specific to a speech object (e.g., a type of character, a specific character, etc.), specific to a speech pattern, specific to a speech context behavior, etc. For example, the user interface 22 may include a character input field for a configurable speech object value that defines a speech object (e.g., a character, etc.) for which a speech pattern and/or a speech context behavior are to be applied. The user interface 22 may further include a probability input field for a configurable probability value to set a rate at which a speech pattern and/or a context behavior are to be applied. Thus, the user interface 22 may allow for the creation of a speech object, a speech pattern, a speech context behavior, etc., the modification of media content, a speech object, a speech pattern, a speech context behavior, a value, and so on.

The speech emulator 20 further includes a speech pattern identifier 24 to automatically identify a speech pattern in media content and a context behavior identifier 26 to automatically identify a speech context behavior in media content. For example, the speech pattern identifier 24 may receive text translated from audio speech, automatically parse the text using a parser program, and automatically identify a speech pattern. The context behavior identifier 26 may also receive and parse text independently from the speech pattern identifier 24, may receive parsed text from the speech pattern identifier 24, and vice versa. The speech pattern identifier 24 and/or the context behavior identifier 26 may further receive parsed text from a parser program that provides access to the parsed text content via, for example, memory, storage, a channel, and so on.

The speech pattern identifier 24 and/or the context behavior identifier 26 may also identify a speech object such as, for example, a real character, a fictional character, a VR character, an AR character, a caricature, and so on. In one example, the speech pattern identifier 24 and/or the context behavior identifier 26 identifies a character from a book, a caricature from a cartoon, a real celebrity from audio content, a VR character from game content, etc. The speech pattern identifier 24 and/or the context behavior identifier 26 may, for example, utilize media content metadata (e.g., scene data, etc.) to identify when a particular speech object is talking, utilize an object recognition device to identify when a particular speech object is talking, utilize the media content itself (e.g., comments embedded in the media content, a character name adjacent to quoted text, etc.) to identify when a particular speech object is talking, and so on. The context behavior identifier 26 and the speech pattern identifier 24 may share information such as, for example, speech object identification information to more efficiently utilize resources.

The speech pattern identifier 24 and/or the context behavior identifier 26 may utilize media content metadata to identify respective speech identification information. The media content metadata may include information describing the environment (e.g., world, time period, etc.), describing a character that is speaking (e.g., a literary character, a VR character, a real character, etc.), describing the media content itself (e.g., episode number, author, etc.), and so on. The speech pattern identifier 24 and/or the context behavior identifier 26 may also utilize the media content itself to identify respective speech identification information. In one example, the speech pattern identifier 24 and/or the context behavior identifier 26 may utilize words in text content (e.g., synonyms, names, etc.), font in text content (e.g., bold, italics, upper-case, etc.), punctuation in media content (e.g., question marks, commas, etc.) words in audio content and/or video content (e.g., pauses, change in languages, accents, etc.), and so on. The speech pattern identifier 24 and/or the context behavior identifier 26 may, for example, utilize object recognition to identify respective speech identification information.

Example Table 1 includes non-limiting examples of speech pattern categories identified in media content by the speech pattern identifier 24. As shown in Table 1, the categories may include an ordered speech pattern, a point-of-view (POV) pattern, and/or a disordered speech pattern.

| Category | Examples Data Classes |
|---|---|
| Ordered Speech Pattern | Synonym, word, phrase, context repetition, rhyming, dramatic pauses, word/phrase inflections, etc. |
| Point of View | 1$^{st}$ person, 2$^{nd}$ person, 3$^{rd}$ person |
| Disordered Speech Pattern | Rambling/long winded response, topic switching, etc. |

An ordered speech pattern may generally include a speech pattern that is consistent and/or predictable in its usage. For example, a character that is being imitated may use word repetition with pronouns. Another character may use phrase repetition at the beginning of sentences within a paragraph. Yet another character may use consistent rhyming between the last words of sentences. Some disordered speech patterns might also be used in a relatively more consistent and/or predicable manner. While such usage may be less common, the speech pattern may be identified/treated by the speech pattern identifier 24 as an ordered speech pattern.

Example Table 2 includes non-limiting examples of ordered speech patterns identified by the speech pattern identifier 24.

| Ordered Speech Patterns | Examples | Factors/Condition |
|---|---|---|
| Synonym Repetition | Where multiple synonyms for one context word are used multiple times in succession. Example: "I do not reiterate, repeat, restate my responses." | Recognize if pattern/behavior is biased to specific parts of speech (verbs, adverbs, pronouns, nouns, adjectives, etc.) for usage. |
| Word Repetition | Where the same word is used multiple times in succession. Example: "I do not, not, not like liver." | Recognize if behavior is biased to specific parts of the response (start/middle/end of sentence, start/middle/end of paragraph, etc.) |
| Phrase Repetition | Word-for-word use of the same phrase multiple times with in the response. Usage can be consecutive or nonconsecutive. | |
| Audible Emphasis | Example: "I do NOT <loud> like liver." | Same as conditions above and additionally a loud/soft volume factor indicating the intensity of the effect. |
| Tempo Emphasis | Example: "I do NOOOOOOT like liver." | Extending or reducing the tempo that a word is phrased with compared to a common tempo used for other parts of the response. |
| Dramatic Pauses | Example: "I do not <pause, 2 sec> like liver." | Same as conditions above and additionally a time factor indicating the duration of the effect. |
| Rhyming | Example: "I do NOT like green eggs and ham. I do not like them, Sam-I-am." | Same as conditions above and additionally contextual linkage between word/phrase pairs. |
| Context Repetition | Repetition of the same contextual content multiple times within a response but the content is rephrased between usages. Usage can be consecutive or nonconsecutive. | |

Additionally, the speech pattern identifier 24 may determine literary usage of the 1st person, 2nd person, and 3rd person. For example, the speech pattern identifier 24 may identify a celebrity and/or a fictional character that utilizes the 3rd person in their speech patterns. The speech pattern identifier 24 may, for example, utilize metadata for the media content (e.g., identifying a scene, a character, etc.) together with the media content (e.g., pronoun, etc.) to determine that a particular speech object (e.g., person, character, etc.) is speaking from a particular point of view. The speech pattern identifier 24 may further identify a disordered speech pattern, which may generally include a speech pattern that is relatively more random in their nature. For example, a character may be "scatter brained" and randomly switch topics mid-response. Another character may stutter. Yet another character may stutter randomly on words within a sentence/paragraph. Some ordered speech patterns might also be used in a more random nature. While such usage may be less common, the speech pattern may be identified/treated by the speech pattern identifier 24 as a disordered speech pattern.

Example Table 3 includes non-limiting examples of speech context behavior categories (and sub-categories) identified in media content by the context behavior identifier 26. As shown in Table 3, the categories of speech context behaviors may include a replacement behavior, a trained behavior, and/or an additive behavior.

| Category/ Sub-category | Description/Brief Functionality |
|---|---|
| Replacement (synonyms) | Paired list for "real world" vs. fictional world/personality specific context. Recognize usage frequency of "real world" vs. world specific/character specific synonyms. |
| Trained (vocabulary) | Determine the vocabulary level and/or range of words available for AI response generation. |
| Additive (sound effects) | Comprehend available character/personality generated sound effects (e.g., Arrrgh, mmmmmm, <whistle>, <slurping>, Evil cackle, hysterical laugh, etc.). Determine where to apply sound effects and frequency of usage. |
| Additive (fillers) | Comprehend available character/personality fillers (e.g., "Um", "like", "ah", "you know", etc.). Ability to determine where to apply fillers and frequency of usage. |

-continued

| Category/ Sub-category | Description/Brief Functionality |
|---|---|
| Replacement (2$^{nd}$ language) | Use of individual words and/or entire phrases from native language and/or switching between native and 2$^{nd}$ language. |
| Replacement (parable sayings) | Sayings that convey a mini story or mental visualization to express an answer in context on their own. Comprehend available character/personality generated sayings. Determine where to apply sayings and frequency of usage. |
| Replacement (additive sayings) | Sayings that do not add context of a response but are characteristic behavior. Comprehend available character/personality generated sayings. Determine where to apply sayings and frequency of usage. |

The context behavior identifier 26 may, for example, utilize metadata for the media content (e.g., scene description data, social media group data, geographic location data, etc.) together with the media content (e.g., synonym, second language, etc.) to identify a speech context behavior. The context behavior identifier 26 may further utilize an object recognition device to identify a speech context behavior. For example, the context behavior identifier 26 may utilize an image object recognition device to determine that a character continues to speak despite pauses, second languages, etc. In another example, the context behavior identifier 26 may utilize media content itself (e.g., audio content, text content, etc.) to identify a stutter, a filler, a saying, and so on. As shown in Table 3, the context behavior identifier 26 may identify frequency of synonyms, a vocabulary level and/or range of words for an AI response, character/personality generated sound effects, character/personality fillers, native language and/or 2$^{nd}$ language features, and/or sayings at a general-object and/or at a specific-object granularity.

The speech emulator 20 further includes a media content tagger 28 to modify media content with a tag such as, for example, a cascading style sheet tag, a markup language formatting tag (e.g., bold, italics, etc.), a markup language speech tag, a markup language context behavior tag, and so on. The media content tagger 28 may, for example, utilize input from the user interface 22 to select a part of media content identified as a particular speech pattern and/or identified as a particular context pattern behavior and tag that part of the media content. The media tagger 28 may also automatically tag media content based on speech identification information from the speech pattern identifier 24 and/or the context behavior identifier 26. For example, the media content tagger 28 may automatically add a speech pattern tag to the media content, may automatically add a speech context behavior tag to the media content, and so on.

The speech emulator 20 further includes a training data provider 30 to provide training data that may be used to more accurately modify speech output from the speech device 12. The training data provider 30 includes a machine learner 32 to analyze tagged data based on a speech pattern and/or a speech context behavior. The machine learner 32 may generate, based on the analysis, a trained speech model used to transform speech data (e.g., text content to be converted to speech in a response) to mimic data (e.g., modified text content to be converted to imitated speech in a response). The machine learner 32 may utilize a speech pattern tag to learn a speech pattern and/or may utilize a speech context behavior tag to learn a speech context behavior at a general-object granularity. The machine learner 32 may, for example, use a speech pattern tag to learn a syntax and/or a composition of a speech pattern in media content that is customary for a group of people (e.g., social media group of people, family members, residents, etc.). The machine learner 32 may also utilize a speech pattern tag to learn a speech pattern and/or may utilize a context behavior tag to learn a speech context behavior at a specific-object granularity. The machine learner 32 may, for example, use a context behavior tag to learn a syntax and/or a composition of a context behavior pattern in media content that is customary for a particular speech object (e.g., a specific character, etc.).

The training data provider 30 further includes a data analyzer 34 to analyze a speech pattern, a speech context behavior, and/or tagged data. The data analyzer 34 may generate, based on the analysis, a programmed speech rule used to transform speech data to mimic data. In one example, the programmed speech rule may be configured via the user interface 22. For example, the programmed speech rule may be generated via a development tool in a source code format (e.g., markup language format, etc.), in a graphical control format (e.g., radial button, etc.), and so on. The programmed speech rule may, for example, be generated from a character input field for a configurable speech object value defining a speech object for which a speech pattern and/or a speech context behavior is to be applied. In addition, the programmed speech rule may be generated from a speech pattern field and/or a speech context behavior field to be selected and/or populated with a value defining a speech pattern and/or a speech content behavior. The programmed speech rule may further be generated from a probability input field to be selected and/or populated with a value defining a configurable probability value that sets a rate at which a speech pattern and/or a context behavior is to be applied.

The training data generator 30 further includes a condition evaluator 36 to determine a factor/condition associated with a speech pattern and/or a speech context behavior. The condition evaluator 36 may, for example, determine a usage frequency for a speech pattern and/or a speech context behavior at a general-object granularity, at a specific-object granularity, etc. For example, the condition evaluator 36 may utilize a probability function to determine a usage frequency and/or a usage threshold value to define how a speech pattern and/or a speech context behavior are applied. Moreover, the condition evaluator 36 may determine a bias for a speech pattern and/or a speech context behavior at a general-object granularity, at a specific-object granularity, and so on.

As shown in Table 1, the condition evaluator 36 may recognize whether a speech pattern is biased to a specific part of speech and/or a specific part of a response. The condition evaluator 36 may further determine a volume factor to indicate an intensity of an audio effect, a tempo factor to indicate a tempo a word is phrased, a time factor to indicate a duration of a dramatic pause, a contextual linkage factor for words and/or phrases of a rhyming speech pattern and/or a context repetition speech pattern, and so on. The condition evaluator 36 may, for example, evaluate media content to determine a factor/condition using a punctuation mark, a capital letter, a tag, audio, video, and so on.

As further shown in example Table 4, the condition evaluator 36 may determine a bias and/or a trigger.

| Category | Description/Brief Capability Description |
|---|---|
| Emotional Triggers | Topic that immediately changes a "mood" and corresponding speech pattern and/or speech context behavior. |
| Response Length Biases | Recognize if a specific speech pattern is biased to be utilized with specific response lengths (short, medium, long, very long). |
| Sentence/ Paragraph Biasing | Recognize if a specific speech pattern and/or speech context behavior is biased to be utilized with specific regions of a sentence or paragraph (start, middle, end). |
| Part of Speech Biasing | Recognize if a specific speech pattern is biased to be utilized with specific parts of speech within a sentence (verbs, adverbs, pronouns, nouns, adjectives, prepositions, conjunctions, interjections, etc.). |

The condition evaluator 36 may determine a response length bias, which indicates whether a speech behavior is utilized with a specific response length (e.g., speech pattern bias in short responses, etc.). The condition evaluator 36 may further determine a sentence/paragraph bias that indicates whether a speech behavior and/or a speech context behavior are utilized with a specific part of a sentence (e.g., speech context behavior bias in the middle of a paragraph, etc.). The condition evaluator 36 may also determine a part of speech bias that indicates whether a speech pattern is utilized with a specific part of speech within a sentence (e.g., synonym repetition bias for nouns, etc.). Thus, condition evaluator 36 may provide information to allow the training data provider 30 to determine where to bias a particular speech pattern and/or speech context pattern. In one example, the bias may be determined using the machine learner 32. Moreover, a baseline may be determined to indicate where and how often speech behaviors occur and the condition evaluator 36 may determine usage rates, bias patterns, randomness, etc., based on the baseline. The condition evaluator 36 may further evaluate any content (e.g., media content, media content metadata, etc.) to determine a hybrid factor that combines an aspect of two or more factors/conditions.

The condition evaluator 36 may also determine an emotional trigger factor, which indicates a trigger that changes a mood of a speech object. Thus, changes in a speech pattern and/or a speech context behavior may be implemented under specific "triggered" emotional conditions. For example, a first character in a book and/or movie may not normally stutter but may characteristically stutter in the presence of a second character that intimidates or scares the first character. The second character, therefore, triggers a stuttering speech pattern in the first character. In one example, a trigger may be defined using the user interface 22 and/or the data analyzer 34. In addition, a trigger may be determined at a general-object granularity, at a specific-object granularity, etc.

The training data provider 30 further includes a context mapper 38 to provide mapped data. The context mapper 38 may, for example, evaluate a reference data set that includes characteristic speech (e.g., a fictional word, a character saying, etc.) for a speech object (e.g., a character context, etc.), a context of a characteristic response by the speech object (e.g., Bikini Bottom world, Cars world, etc.), and/or the characteristic response (e.g., an entire response with a stutter, etc.). The context mapper 38 may further map, for an identified speech context behavior, a feature associated with the response (e.g., a baseline word, a response context, an emotional trigger, etc.), available speech data based on the characteristic response that is to be available to modify the audio data (e.g., the characteristic speech, similar speech and/or sayings that are learned, etc.), and/or an identification of the speech object for which the available speech data is to be applied.

The context mapper 38 may further assess a vocabulary input data set for a particular speech object (e.g., a character, a personality type, etc.). Thus, word selection may be restricted and/or biased to that data set to provide word choices consistent with the speech object. Establishing a proper vocabulary may be important to provide a consistent interaction with a desired character and/or personality type of an AI.

Example Table 5 shows how the context mapper 38 may map a replacement context that is learned via a machine learning model (e.g., the trained speech model generated by the machine learner 32) and/or a programmed rule to provide a specific context to the Bikini Bottom world for the television program SpongeBob SquarePants.

| Baseline Word | Character/ Fictional Word | Character Context | Configured Usage Rate |
|---|---|---|---|
| car, automobile, vehicle | invisible boatmobile, boatmobile | Mermaid Man, Barnacle Boy | 1 |
| car, automobile, vehicle | boat | Spongebob, Mrs. Puff, Patrick | 1 |
| bus | Bikini Bottom bus | Patrick, Spongebob, Squidward, Mr. Krabs | 0.45 |
| hamburger | Krabby Patty | <All Characters> | 1 |

In one example for replacement context categories, a character and/or world specific context may not always be used as a substitution. For example, the term "bus" in SpongeBob SquarePants is commonly called both the common term "bus" as well as the world specific term "Bikini Bottom Bus". However in the case of Mermaid Man's "car", the term is always referred to by using only the world specific terms of either "invisible boatmobile" or "boatmobile". Thus, a machine learning/deep learning model and/or a programmed rule may be configured to set a baseline versus a character/world usage rate for a replacement context to more accurately imitate speech. In the illustrated example, the usage frequency for the replacement term "Bikini Bottom bus" may be used approximately half the time in which a baseline response is to include the term "bus" when Patrick, Spongebob, Squidward, and/or Mr. Krabs is imitated.

Example Table 6 shows how the context mapper 38 may map an additive context learned via a machine learning model and/or a programmed rule to provide a specific context to Disney's world for the Cars franchise.

| Response/ Emotional Context | Additive Saying Options | Character Context | Configured Usage Rate |
|---|---|---|---|
| happy, excited, overjoyed, thrilled | I'm happier than a tornado in a trailer park! | Mater | 1 |

-continued

| Response/ Emotional Context | Additive Saying Options | Character Context | Configured Usage Rate |
|---|---|---|---|
| | This is better than tractor tippin'!<br>Better n' Fillmore's special fuel!<br>Ahh, but best not to tell Fillmore that." | | |
| Frustrated, disappointed, upset | Dad-gum!<br>Shoot!<br>Dad-gum and shoot! | Mater | 0.7 |
| Nervous | Um<br>Er<br>Ah | Mater, Lighting, Sally | 0.12 |

For additive context categories, sayings and/or sounds may be mapped to allow for insertion into a standard/baseline response. For example, if the speech device 12 is to respond to a user question "are you having a good time?" for the Mater character (from the movie Cars) a baseline response may be "Yes!", "Absolutely!", or "Of course!" To make the response more characteristic of the Mater character, an additive saying may be added instead of merely responding "Absolutely!" In this regard, an additive saying may be inserted to generate a response: "Absolutely! I'm happier than a tornado in a trailer park." Accordingly, the speech emulator 20 includes a speech data modifier 40 that modifies speech data to generate mimic data based on a trained speech model and/or a programmed speech rule. In the above example, the mimic data is the response modified with the added additive saying.

The speech data modifier 40 may, for example, utilize a trained speech model, a programmed speech rule, a factor, and/or a mapped data to modify speech data and generate mimic data. For example, speech data may include a response that is generated by the speech device 12 in reply to an inquiry from a user. In this example, a user may ask a question or request content and the speech device 12 may prepare a response to the question or retrieve the content. The speech data modifier 40 may, in reply, modify the response to the question or the content before it is rendered to the user, and forward the modified question or content to the speech device 12 as mimicked speech. The speech data modifier 40 may also generate an instruction that instructs the speech device 12 how to implement the modification for outputting the mimicked speech.

In one example, an intelligent personal assistant device may provide text content to the speech data modifier 40 before it is transformed to speech and output via the speech output device 14. In this example, the speech data modifier 40 may apply a trained speech model, a programmed speech rule, a factor, and/or a mapped data to modify the text content and generate mimic data (e.g., the text content with additional text that more closely resembles speech imitated by a desired speech object). In another example, the speech data modifier 40 may apply a trained speech model, a programmed speech rule, a factor, and/or a mapped data to generate a markup language instruction (e.g., a SSML tag, etc.) that is to instruct the speech device 12 how to modify the text content for generating mimicked speech (e.g., the text content with the modifications).

Accordingly, there is a more characteristic response for a targeted personality. Indeed, the speech imitation system 10 may provide for different intelligent personal assistants of a same user to have different (non-standard) personalities (e.g., parent bedroom assistant with a southern drawl, child bedroom with a caricature personality, automobile navigation system with a customized personality, etc.). In another example, each character in an audio book may speak according to their respective personalities. In yet another example, that same audio book may be rendered as if read by any desired/selected speech object (e.g., a pirate, a celebrity, etc.). Thus, the speech imitation system 10 may convert audio inputs from a user into text-based statements/questions, derive baseline responses, provide standard assistant use, provide educational/social media use, use fictional world/personality context for entertainment use, derive applicable voicing tonality and as inputs needed for applicable speech pattern selection, use text-to-speech to convert a text response to an audio response, utilize graphics engine APIs to drive corresponding character movement, mouthing, and/or body language to correspond to an response emotional context and/or content, and so on.

Example Table 7 shows some use examples where the speech imitation system 10 might be implemented to provide an authentic interaction with a character personality.

| Use Case | Example Application |
|---|---|
| Audio only AI | Audibly interact with a selected character. Character responses are consistent with the mimicked personality's actual/fictional history. Interaction can be an open-ended discussion with the character or an ad-hoc interaction with the "Terminator" through a core storyline. |
| Immersive Character AI | Audibly and visually (2D/AR/VR) interact with a selected character. Character audible & visual responses are consistent with the mimicked personality's actual/fictional history. Interaction can be an open-ended discussion with the character or an ad-hoc interaction with "Tinker Bell" through a core storyline. |
| Education Character AI | Audibly and visually (2D/AR/VR) interact with a selected character. Character audible and/or visual responses are consistent with the mimicked personality's actual/fictional history, but also supplemented with a specific set of subject matter that is outside of the character's normal knowledge set. For example "SpongeBob's" personality can be augmented with specific subject matter to teach a $3^{rd}$ grade US History lesson or to teach corporate workers on the new social media policy. |

-continued

| Use Case | Example Application |
|---|---|
| Social Character AI | Audibly and visually (2D/AR/VR) interact with a selected character. Character audible and/or visual responses are consistent with the mimicked personality's actual/fictional history, but also supplemented with a specific set of social matter that is outside of the character's normal knowledge set. For example "Yoda's" personality can be augmented with knowledge of current trending social web site topics to discuss with the user. |

While examples have provided various components of the speech imitation system 10 for illustration purposes, it should be understood that one or more components of the speech imitation system 10 may reside in the same and/or different physical and/or virtual locations, may be combined, omitted, bypassed, re-arranged, and/or be utilized in any order. Moreover, any or all components of the speech imitation system 10 may be automatically implemented (e.g., without human intervention, etc.).

Figure 2:
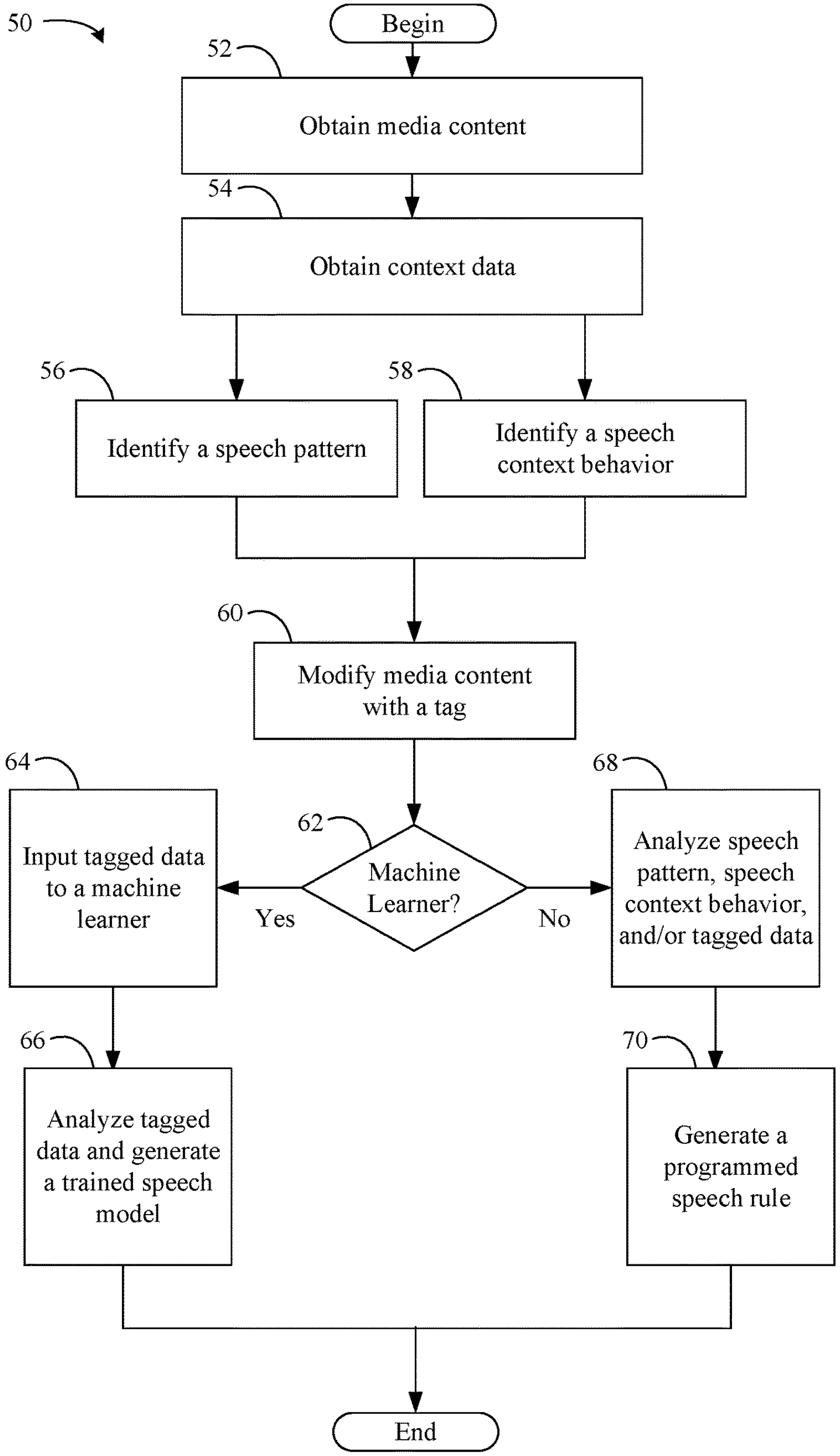
FIG. 2 is a flowchart of an example of a method to imitate speech by training/configuring a speech pattern and/or a speech context behavior according to an embodiment.

Turning now to FIG. 2, a method 50 is shown to imitate speech by training/configuring a speech pattern and/or a speech context behavior. The method 50 may be implemented by, for example, any or all components of the speech imitation system 10 (FIG. 1), discussed above. The method 50 may be implemented as a set of logic instructions stored in a machine- or computer-readable storage medium such as random access memory (RAM), read only memory (ROM), programmable ROM (PROM), firmware, flash memory, 3DXP memory, etc., in configurable logic such as, for example, programmable logic arrays (PLAs), field programmable gate arrays (FPGAs), complex programmable logic devices (CPLDs), or any combination thereof.

For example, computer program code to carry out operations shown in the method 50 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 52 provides for obtaining media content. In one example, the media content includes speech data received form a speech device (e.g., a baseline response). The speech data may also be retrieved from memory, storage, a communication channel, and so on. Thus, the speech data may include a transcript from existing text, video, audio, and so on. In a further example, the media content may be newly created media content. Thus, the speech data may be created for a relevant character, for a speech pattern type, for a particular world, etc. Illustrated processing block 54 provides for obtaining context data corresponding to the media content. Context data may include, for example, metadata that defines a world, a scene, a timeline, etc.

Illustrated processing block 56 provides for identifying a speech pattern such as, for example, an ordered speech pattern, a literary point of view, and/or a disordered speech pattern. Additionally, illustrated processing block 58 provides for identifying a speech context behavior such as, for example, a trained behavior, a replacement behavior, and/or an additive behavior. Illustrated processing block 60 provides for modifying media content with a tag such as, for example, a speech pattern tag and/or a speech context behavior tag to generate tagged data that is to be used as a training data set.

Tagged data example 1 shows a training data set for context repetition, emphasis, and non-standard speech patterns from "Mojo Jojo" in Nickelodeon's television Power Puffs Gils series.

```
<p>
    Come
    <Emphasis><Strong> alone </Strong></Emphasis>
    to my liar.
    <ContextRepetition><Context> 1 </Context> Do not bring Buttercup or Bubbles.
</ContextRepetition>
    <ContextRepetition><Context> 1 </Context> You must come without them
</ContextRepetition>!
    When you arrive,
    <ContextRepetition><Context> 1 </Context> you must not be accompanied by anyone
</ContextRepetition>
    <ContextRepetition><Context> 1 </Context> especially Buttercup and Bubbles;
</ContextRepetition>
    <ContextRepetition><Context> 2 </Context> they are to remain uninformed
</ContextRepetition>
    <ContextRepetition><Context> 2 </Context> by you not telling them anything
</ContextRepetition>.
    Remember,
    <Non-Standard Grammar> Mojo know you no fool </Non-Standard Grammar>
    <ContextRepetition><Context> 1 </Context> so come alone </ContextRepetition>
    <ContextRepetition><Context> 1 </Context> without Buttercup or Bubbles,
</ContextRepetition>
    <ContextRepetition><Context> 1 </Context> by yourself </ContextRepetition>,
    <ContextRepetition><Context> 1 </Context> with no one with you </ContextRepetition>,
    <ContextRepetition><Context> 1 </Context> by yourself </ContextRepetition>,
```

-continued

```
    <ContextRepetition><Context> 1 </Context> alone </ContextRepetition>,
    <ContextRepetition><Context> 1 </Context> yourself </ContextRepetition>.
</p>
```

In the illustrated example, a character states "Come alone to my lair", with context and/or emphasis on the term "alone". In reply, the term "alone" is tagged using an <Emphasis> tag to indicate emphasis and a <Strong> tag to indicate volume of the emphasis. The character then states "Do not bring Buttercup or Bubbles", "You must come without them", "you must not be accompanied by anyone", and "especially buttercup or bubbles", which reinforces repetition of a common response context (Context 1). Notably, there is no direct synonym usage but the context may be recognized and tagged using a <Context> tag while a speech pattern (e.g., context repetition) may be recognized and tagged using a <ContextRepetition> tag.

A pattern may also be linked (e.g., variations of the same subject matter). For example, there may be a context switch from Context 1 to Context 2 when the character states "they are to remain uninformed" and "by you not telling then anything". These statements are contextually linked with one another (Context 2) using a <Context> tag for a speech pattern that is identified and tagged using the <ContextRepetition> tag, which is different than other statements contextually linked with one another (Context 1) using a <Context> tag for the same speech pattern that is identified and tagged using the <ContextRepetition> tag. Moreover, as shown in tagged data example 1, non-standard grammar may be tagged using a <Non-Standard Grammar> tag.

Tagged data example 2 shows a training data set for context repetition and synonym repetition speech patterns from "Mojo Jojo" in Nickelodeon's Power Puffs Gils series.

```
<p>
    <ContextRepetition><Context> 1 </Context> I do not talk like that
    </ContextRepetition>!
    <ContextRepetition><Context> 1 </Context> The way I
    communicate is much different
</ContextRepetition>!
    I do not
    <SynonymRepetition> reiterate, repeat, restate
    </SynonymRepetition>
    the same thing over and over again! I am
    <SynonymRepetition> clear, concise, to the point
    </SynonymRepetition>!
</p>
```

In the illustrated example, a context may be recognized and tagged using a <Context> tag while a speech pattern (e.g., context repetition) may be recognized and tagged using a <ContextRepetition> tag. Moreover, a character states "I do not reiterate, repeat, restate the same thing over and over again! I am clear, concise, to the point!" Thus, a speech pattern (e.g., synonym repetition) may be recognized and tagged using a <SynonymRepetition> tag for synonyms.

Tagged data example 3 shows a training data set for phrase repetition and rhyming speech patterns from Dr. Seuss' book Green Eggs And Ham.

```
    <p>
        <PhraseRepetition> I do not like </PhraseRepetition>
        green eggs and
        <Rhyming><Context> 1 </Context> ham </Rhyming>.
```

-continued

```
        <PhraseRepetition> I do not like </PhraseRepetition>
        them,
        <Rhyming><Context> 1 </Context> Sam-I-Am </Rhyming>.
    </p>
```

In the illustrated example, a speech pattern (e.g., phrase repetition) for a phrase "I do not like" may be recognized and tagged using a <PhraseRepetition> tag. In addition, a speech pattern (e.g., rhyming) for the terms "ham" and "Sam-I-Am" may be recognized and tagged using a <Rhyming> tag. Moreover, a context may be recognized and tagged using a <Context> tag to contextually link the terms "ham" and "Sam-I-Am" in the context of rhyming that involves a particular repeated phrase.

Tagged data example 4 shows a training data set for word repetition and point of view patterns for "Elmo" from PBS' Sesame Street series.

```
    <p>
        Now
        <3rdPerson> Elmo </3rdPerson>
        has a question for
        <WordRepetition>all-all-all-all </WordRepetition>
        you.
    </p>
```

In the illustrated example, a character states in the literary 3rd person "Now Elmo has a question for all-all-all-all you." In response, a speech pattern (e.g., point of view) may be recognized and tagged using a <3rdPerson> tag. In addition, a speech pattern (e.g., word reputation) for the terms "all" may be recognized and tagged using a <WordRepetition> tag. Notably, the syntax may be user-defined and/or modifiable in a transcript. Thus, for example, a hyphen is one non-limiting example of a learnable syntax (e.g., for a repeated word) from a transcript that may be used to distinguish between letters, terms, sentences, paragraphs, and so on.

Tagged data example 5 shows a training data set for a stuttering speech pattern for "Elmer Fudd" from Warner Brothers' Looney Tunes series.

```
    <p>
        <Stutter> N-no </Stutter>
        - I mean, yes!
        <Stutter> M-my </Stutter>
        partner, Daffy Duck, will be
        <Stutter> r-right </Stutter>
        back. He's out
        <Stutter> c-c-c-cashing </Stutter>
        a check.
    </p>
```

In the illustrated example, a speech pattern (e.g., stutter) for the terms "M-my", "r-right", and "c-c-c-cashing" may be recognized and tagged using a <Stutter > tag. Notably, the syntax may be user-defined and/or modifiable in a transcript. Thus, a hyphen is a non-limiting example of learnable syntax (e.g., for a stutter) from a transcript that may be used to distinguish between letters, terms, sentences, paragraphs, etc.

Tagged data example 6 shows a training data set for additive sayings with corresponding context applicability from Nickelodeon's SpongeBob SquarePants.

```
<p>
    <AdditiveSaying><Context> surprise, shock, excitement, alarm
    </Context> Jumping
jellyfish </AdditiveSaying>
    Mermaid man he's destroying the shield.
</p>
```

In the illustrated example, a context may be recognized and tagged using a <Context> tag to indicate an emotional state of a character. In one example, the emotional state may be determined from media content metadata, from the content itself (e.g., descriptive words in text, object recognition, etc.), and so on. In this example, the character is surprised, in shock, excited, and/or alarmed when a shield is being destroyed and states "Jumping jellyfish". Thus, a speech context behavior (e.g., additive saying) may be recognized and tagged using a <AdditiveSaying> tag.

Tagged data example 7 shows a training data set for parable sayings with corresponding context applicability for "Mater" from Disney's Cars movie.

```
<p>
    <ParableSaying><Context> humor, funny, silly, hilarious </Context>
    I don't care
    who you are, that's funny right there </ParableSaying>.
</p>
```

In the illustrated example, a context may be recognized and tagged using a <Context> tag to indicate an emotional state of a character. In one example, the emotional state may be determined from media content metadata, from the content itself (e.g., descriptive words in text, object recognition, etc.), and so on. In this example, the character is being humorous, funny, silly, and/or hilarious and states "I don't care who you are, that's funny right there". Thus, a speech context behavior (e.g., parable saying) may be recognized and tagged using a <ParableSaying> tag.

Tagged data example 8 shows a training data set for dramatic pausing usage and $2^{nd}$ language usage with corresponding context for "Luigi" from Disney's Cars movie.

```
    <p>
        On your marks, get set <Pause> 1s </Pause>
        <2ndLanguage><Source> Italian </Source><Context> one
        </Context> uno
        </2ndLanguage>
        for the money,
        <2ndLanguage><Source> Italian </Source><Context> two
        </Context> due
        </2ndLanguage>
        for the show,
        <2ndLanguage><Source> Italian </Source><Context> three
        </Context> tre
        </2ndLanguage>
        to get ready, and
        <2ndLanguage><Source> Italian </Source><Context> four
        </Context> quatro
```

-continued

```
        </2ndLanguage>
        To <Pause> 1s </Puase>
        I can't believe it<Pause> 1s </Puase>
        go!
    </p>
```

In the illustrated example, a speech pattern (e.g., dramatic pause) between the terms "get set" and "uno" may be recognized and tagged using a <Pause> tag. In this example, the duration of the dramatic pause is one second. Moreover, a context may be recognized and tagged using a <Context> tag to indicate a counting context (e.g., one, two, three, four). In addition, a character may switch from one language to another during speech. Thus, a speech context behavior (e.g., $2^{nd}$ language) may be recognized and tagged using a <2ndLanguag> tag and using a <Source> tag to identify the language. In this example, the character switches the English language term "one" to the Italian language term "uno", and so on.

Tagged data example 10 shows a training data set for tempo emphasis, sound effect, fillers, pauses, and word repetition for "Cookie Monster" from Sesame Street.

```
<p>
    Today, me here in local bakery here to talk about a word,
    <Pause> 1.0s </Pause>
    <Tempo><AdjFactor> 2.0 </AdjFactor> important </Tempo>.
    <Filler> Yeah <Filler>
    , when something is
    <Tempo><AdjFactor> 1.5 </AdjFactor> important </Tempo>
    , it means a
    <Tempo><AdjFactor> 1.5 </AdjFactor> whole lot to you </Tempo>.
    For instance,
    <WordRepetition><Filler> oh </Filler>, <Filler> oh,
    </Filler></WordRepetition>
    <WordRepetition> look, <Pause> 0.5s </Pause> look
    </WordRepetition>
    over here.
    <Filler> See </Filler>
    , take this oatmeal cookie it
    <Tempo><AdjFactor> 1.5 </AdjFactor> important </Tempo>.
    It mean
    <Tempo><AdjFactor> 1.5 </AdjFactor> whole lot to me </Tempo>.
    <SoundEffect><Tempo><AdjFactor> 2.0 </AdjFactor> Agh, Agh,
    Agh
    </SoundEffect></Tempo>
    <SoundEffect> Um, Um <Pause> 0.5s </Pause> Um, Um
    </SoundEffect>
    <SoundEffect> Mmm, Mmm </SoundEffect>
</p>
```

In the illustrated example, a speech pattern (e.g., tempo emphasis) for a term "important" may be recognized and tagged using a <Tempo> tag to indicate a tempo emphasis and a <AdjFactor> tag to indicate tempo of the emphasis. In this example, the tempo is twice as slow than normal (e.g., 2.0 seconds where baseline tempo is 1.0 second). Tempo, however, may defined on any scale to be relatively faster, slower, etc. Moreover, a speech context behavior (e.g., filler) may be recognized and tagged using a <Filler> tag. In this example, the character first speaks the term "oh" repeatedly. Thus, a speech context behavior (e.g., word repetition) may also be recognized and tagged using a <WordRepetition> tag for the term "oh". A speech context behavior (e.g., sound effect) may be recognized and tagged using a <SoundEffect> tag for the term "Mmm".

A determination may be made at block 62 whether a machine learner is to be implemented. If so, illustrated processing block 64 provides for inputting tagged data to the machine learner. In addition, illustrated processing block 66 provides for analyzing the tagged data that is generated based on a speech pattern and/or a speech context behavior in media content. Block 66 may further generate, based on the analysis, a trained speech model that is to be applied to transform speech data to mimic data. The trained speech model is to automatically determine an appropriate speech pattern and/or speech context behavior to apply to speech data for more accurately imitating speech. Block 66 may further determine a factor and/or mapped data to generate the trained speech model. For example, block 66 may determine a usage frequency, a response trigger, and/or a bias to be incorporated in the trained speech model. Moreover, block 66 may evaluate a reference data set and map, for an identified speech context behavior (e.g., synonym replacement, additive saying, etc.), a feature associated with the response (e.g., baseline word from Table 5, response context Table 6, etc.), available speech data based on the characteristic response that is to be available to modify the audio data (e.g., characteristic speech, character fictional word from Table 5, additive saying from Table 6, etc.), and/or an identification of the speech object for which the available speech data is to be applied (e.g., character context from Tables 5-6).

If a determination is made at block 62 that a machine learner is not to be implemented, illustrated processing block 68 provides for performing an analysis of a speech pattern, a speech context behavior, and/or tagged data. Block 62 may, for example, utilize a probability function to determine a distribution of a speech pattern and/or a speech context behavior in media content, determine a corresponding threshold value, determine when to automatically apply a speech pattern and/or a speech context behavior, and so on. Block 68 may also provide a user interface to receive user input that is provided based on a distribution and/or a threshold value. Block 68 may, for example, provide a development tool that allows a user to review media content (e.g., text transcribed from audio content, etc.) and determine a distribution of a speech pattern and/or a speech context behavior in the media content.

Illustrated block 70 provides for generating, based on the analysis, a programmed speech rule that is to be applied to transform the speech data to the mimic data. In one example, block 70 may provide a character input field for a configurable speech object value defining a speech object for which one or more of a selected speech pattern or a selected speech context behavior is to be applied. In another example, block 70 may provide a probability input field for a configurable probability value defining a rate at which a selected speech pattern and/or a selected context behavior are to be applied. Block 70 may, for example, generate a programmed speech rule to control a speech behavior for stuttering. Programmed speech rule example 1 shows a programmed speech rule for a speech pattern (e.g., stuttering).

```
<Stuttering>
    <Character Occurrence>
    <Property Name = "Character Subset" Value = "Ron Weasley, Neville
Longbottom"/>
    <Triggers>
        <Property Name = "OccurrenceProbability_Non-Triggered" Value =
    "0.0"/>
        <Property Name = "OccurrenceProbability_Triggered " Value = "0.13"/>
    </Triggers>
    <ResponseLengthBiasing>
        <Property Name = "OccurrenceProbabilityShortLengthResponses" Value
    = "0.2"/>
        <Property Name = "OccurrenceProbabilityMediumLengthResponses"
    Value = "0.4"/>
        <Property Name = "OccurrenceProbabilityLongLengthResponses" Value
    = "0.4"/>
    </ResponseLengthBiasing>
    <Sentence_Biasing>
        <Property Name = "FirstWordProbability" Value = "0.25"/>
        <Property Name = "LastWordProbability" Value = "0.0"/>
        <Property Name = "RandomWordProbability" Value = "0.75"/>
    </Sentence_Biasing>
    <PartsOfSpeechBiasing>
        <Property Name = "NounsProbability" Value = "0.2"/>
        <Property Name = "VerbsProbability" Value = "0.1"/>
        <Property Name = "AdjectivesProbability" Value = "0.2"/>
        <Property Name = "AdverbsProbability" Value = "0.1"/>
        <Property Name = "PronounsProbability" Value = "0.1"/>
        <Property Name = "PrepositionsProbability" Value = "0.1"/>
        <Property Name = "ConjunctionsProbability" Value = "0.15"/>
        <Property Name = "InterjectionsProbability" Value = "0.05"/>
    </ PartsOfSpeechBiasing >
        </CharacterOccurrence>
</Stuttering>
```

In the illustrated example, a programmable speech rule is configured to define a character for which a speech pattern (e.g., stuttering) is to be applied. Thus, stuttering is to be applied to the characters "Ron Weasley" and "Neville Longbottom" from the Harry Potter series. In addition, values for various factors may be set to define a rate at which the speech pattern is to be applied. In the illustrated example, a trigger and a bias are defined to configure how stuttering is to be applied for the selected characters. For example, the property "OccurrenceProbability_Non-Triggered" indicates a probability that the selected characters stutter under standard/baseline conditions (e.g., happy, excited, etc.). Meanwhile, the property "OccurrenceProbability_Triggered" indicates a probability that the selected characters stutter in a triggered state (e.g., nervous, etc.). In this example, the selected characters are configured to stutter at a rate of 13% in the triggered state and are configured to not stutter at all in the standard state.

Additionally, a response length bias may be configured to set a probability value defining a rate at which stuttering is to be applied for the selected characters based on response length. For example, a character may stutter more frequently during a relatively short response (e.g., 2-3 word response), a relatively long response, and so on. Moreover, a sentence bias may be configured to set a probability value defining where within a sentence the selected characters stutter. In this example, the selected characters are configured to stutter 25% of the time at the first word of a sentence, never at the last word of a sentence, and randomly 75% of the time in a sentence. In addition, a part of speech bias may be configured to set a probability value defining the parts of speech that relate to a stutter. In this example, the selected characters are configured to stutter for 20% of nouns and adjectives, 10% of verbs, adverbs, pronouns, and propositions, etc.

Thus, block 70 provides a programmed speech rule that automatically applies an appropriate speech pattern and/or speech context behavior to speech data for more accurately imitating speech. Block 70 further provides a factor and/or mapped data to generate the programmed speech rule. For example, block 70 may define a usage frequency, a response trigger, and/or a bias to be incorporated in the programmed speech rule. Moreover, block 70 may utilize a reference data set and map, for an identified speech context behavior, a feature associated with a response, available speech data based on a characteristic response that is to be available to modify audio data, and/or an identification of the speech object for which the available speech data is to be applied.

While independent blocks and/or a particular order has been shown for illustration purposes, it should be understood that one or more of the blocks of the method 50 may be combined, omitted, bypassed, re-arranged, and/or flow in any order. Moreover, any or all blocks of the method 50 may be automatically implemented (e.g., without human intervention, etc.).

Figure 3:
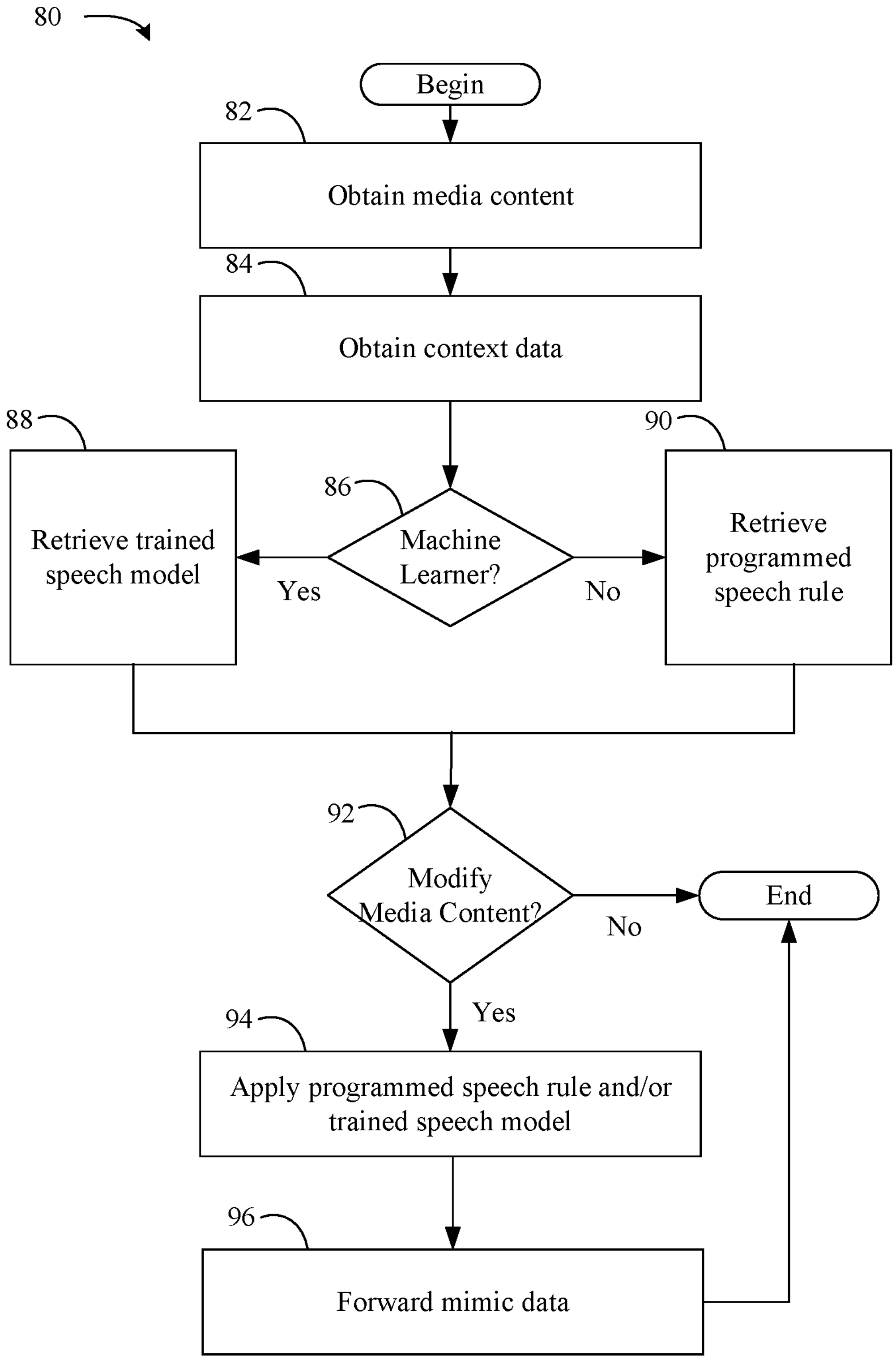
FIG. 3 is a flowchart of an example of a method to imitate speech by transforming a baseline response to a modified response based on a speech pattern and/or a speech context behavior according to an embodiment.

FIG. 3 shows a method 80 to imitate speech by transforming a baseline response to a modified response based on a speech pattern and/or a speech context behavior. The method 80 may be implemented by, for example, any or all components of the speech imitation system 10 (FIG. 1), discussed above. The method 80 may be implemented as a set of logic instructions stored in a machine- or computer-readable storage medium such as random access memory (RAM), read only memory (ROM), programmable ROM (PROM), firmware, flash memory, 3DXP memory, etc., in configurable logic such as, for example, programmable logic arrays (PLAs), field programmable gate arrays (FPGAs), complex programmable logic devices (CPLDs), or any combination thereof.

For example, computer program code to carry out operations shown in the method 80 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 82 provides for obtaining media content. Accordingly, block 82 may operate substantially similar to block 52 (FIG. 2), discussed above. Illustrated processing block 84 provides for obtaining context data corresponding to the media content. Thus, block 84 may operate substantially similar to block 54 (FIG. 2), discussed above. A determination may be made at block 86 whether a machine learner is to be implemented. A machine learner may be implemented, for example, at a predetermined frequency (e.g., 80% of the time), based on a preference to use a trained speech model anytime it is available, based on a preference for a particular type of media content, based on a preference for a particular type of speech object type, etc. If so, a trained speech model is retrieved at processing block 88. If not, a programmed speech rule is retrieved at processing block 90. The trained speech model and/or the programmed speech rule may be retrieved from memory, storage, a communication link, and so on.

A determination may be made at block 92 whether the media content is to be modified with a speech context pattern and/or a speech context behavior. For example, a baseline response to a question may be received from an intelligent personal assistant and a determination may be made that the baseline response is to be rendered as if a fictional character spoke it. Thus, illustrated processing block 94 applies a programmed speech rule configured for that fictional character and/or a trained speech model learned for that fictional character to the media content to modify the baseline response that is rendered to more closely mimic the fictional character. The response may, therefore, be modified based on a speech pattern, a speech context behavior, a factor, mapped data, and so on. For example, a response may be modified to generate mimic data based on model assessments for character and/or world context, learned and/or configured behavior, frequency usage, triggers, biases, and so on. In one example, an encyclopedia may be read by a character from Nickelodeon's SpongeBob SquarePants. When surprise, shock, excitement, and/or alarm might be encountered in the encyclopedia (e.g., an image of a spider, etc.), an additive saying "Jumping jellyfish" may be added to the speech based on the trained speech model generated using tagged data example 6, discussed above.

Illustrated processing block 96 provides for forwarding the mimic data. The mimic data may be forwarded to memory and/or storage for later use. The mimic data may also be forwarded to a speech device to output the mimicked speech in real-time. In one example, the mimic data is text of the mimicked speech. For example, a response may be received in a text format, modified by adding and/or deleting text to more accurately imitate a desired character/personality, and the modified text may be sent to the speech device to output the mimicked speech. In another example, the mimic data may include an instruction (e.g., a markup language tag, etc.) that is to instruct a speech device how to output the mimicked speech. In this regard, a library of instructions may be accessible to the speech device to interpret particular instructions. When modification of the media content is completed and/or when a determination is made at block 92 that the media content is not to be modified with a speech context pattern and/or a speech context behavior, the method 80 ends.

While independent blocks and/or a particular order has been shown for illustration purposes, it should be understood that one or more of the blocks of the method 80 may be combined, omitted, bypassed, re-arranged, and/or flow in any order. Moreover, any or all blocks of the method 80 may be automatically implemented (e.g., without human intervention, etc.).

Figure 4:
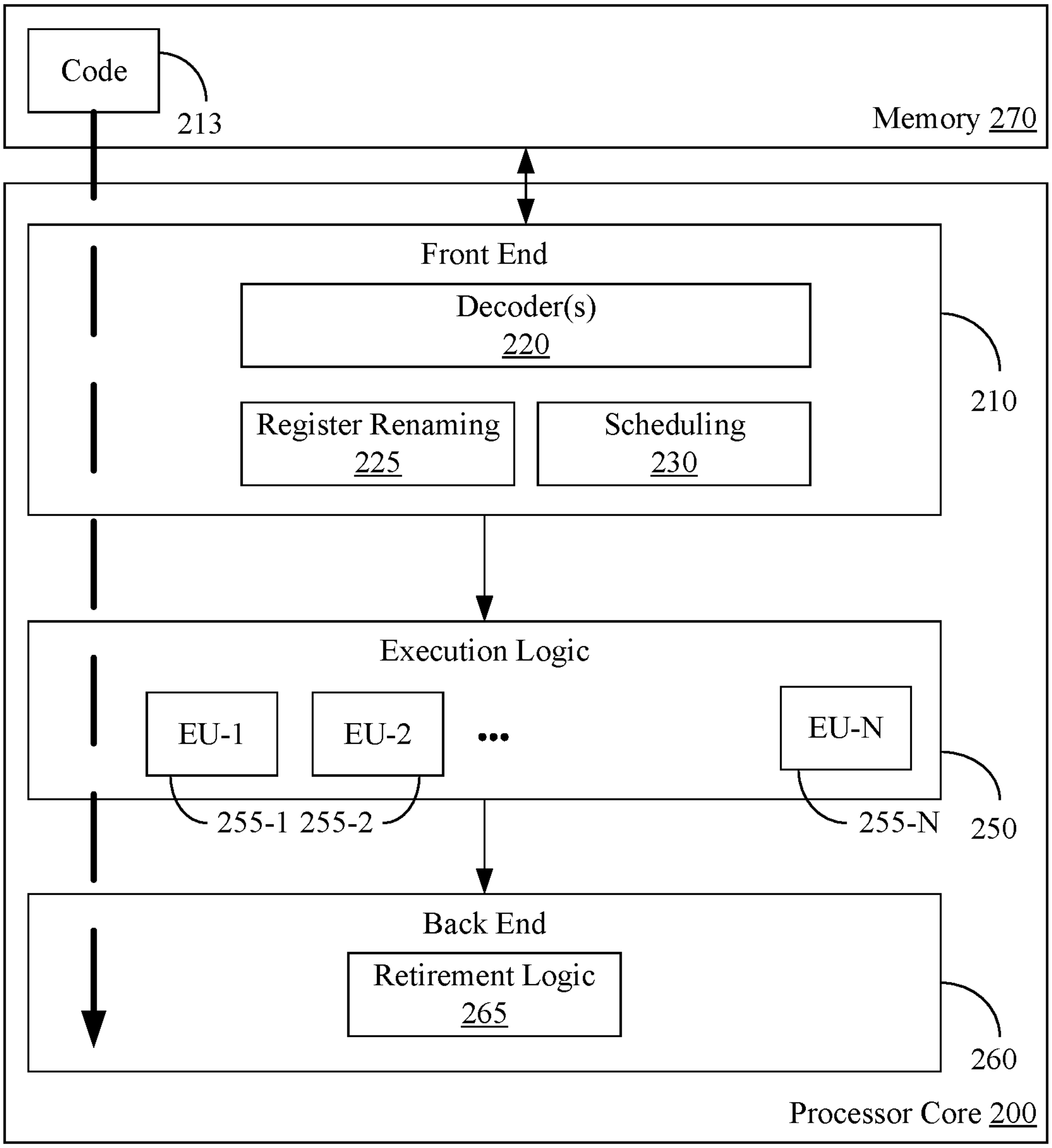
FIG. 4 is a block diagram of an example of a processor according to an embodiment.

Turning now to FIG. 4 illustrates a processor core 200 according to one embodiment. The processor core 200 may be the core for any type of processor, such as a microprocessor, an embedded processor, a digital signal processor (DSP), a network processor, or other device to execute code. Although only one processor core 200 is illustrated in FIG. 4, a processing element may alternatively include more than one of the processor core 200 illustrated in FIG. 4. The processor core 200 may be a single-threaded core or, for at least one embodiment, the processor core 200 may be multithreaded in that it may include more than one hardware thread context (or "logical processor") per core.

FIG. 4 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement any or all components of the speech imitation system 10 (FIG. 1), any or all blocks of the method 50 (FIG. 2), and/or any or all blocks of the method 80 (FIG. 3), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 4, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 5:
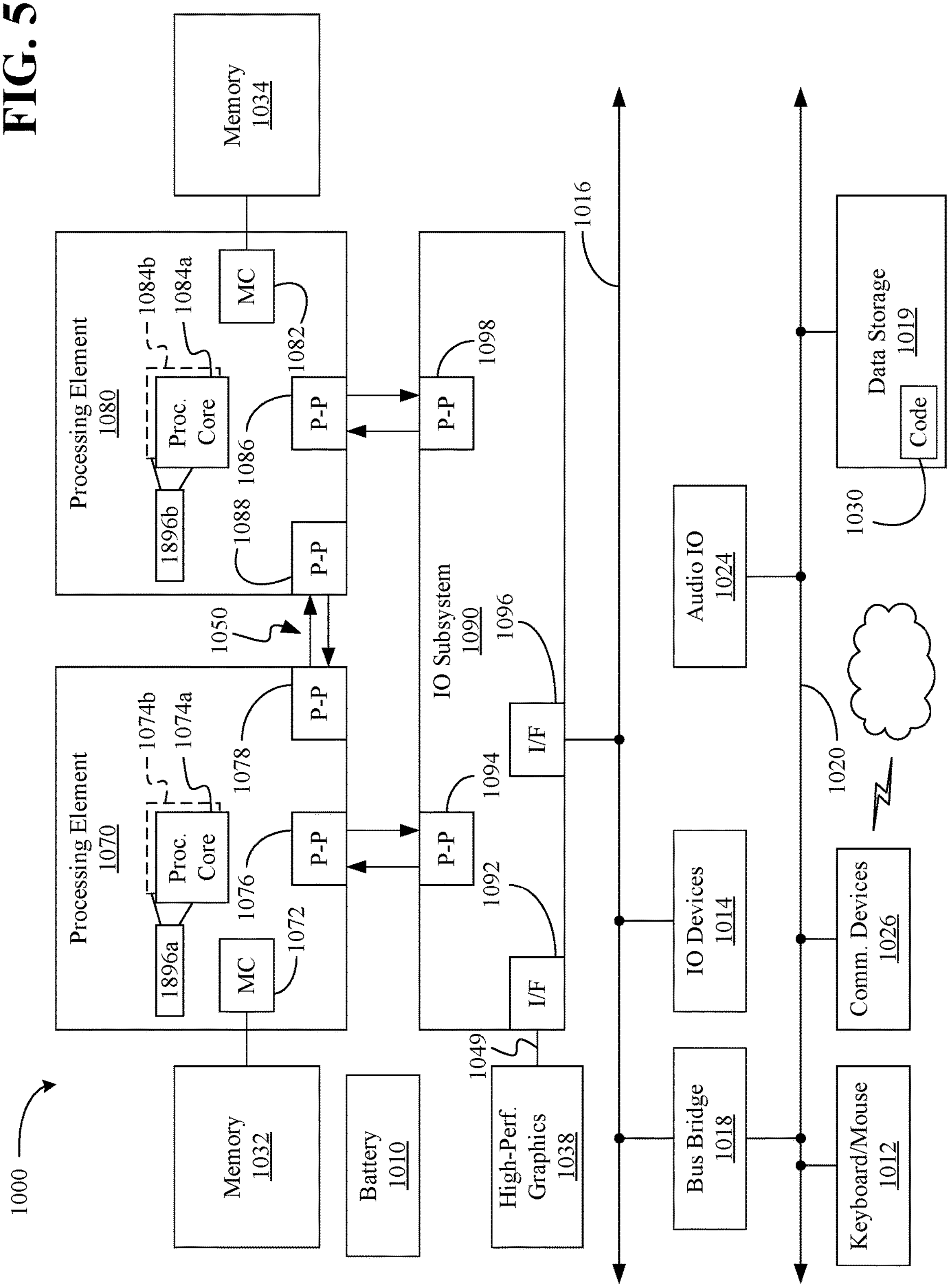
FIG. 5 is a block diagram of an example of a system according to an embodiment.

Referring now to FIG. 5, shown is a block diagram of a system 1000 embodiment in accordance with an embodiment. Shown in FIG. 5 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 5 may be implemented as a multi-drop bus rather than point-to-point interconnect.

As shown in FIG. 5, each of processing elements 1070 and 1080 may be multicore processors, including first and second processor cores (i.e., processor cores 1074*a* and 1074*b* and processor cores 1084*a* and 1084*b*). Such cores 1074*a*, 1074*b*, 1084*a*, 1084*b* may be configured to execute instruction code in a manner similar to that discussed above in connection with FIG. 4.

Each processing element 1070, 1080 may include at least one shared cache 1896*a*, 1896*b* (e.g., static random access memory/SRAM). The shared cache 1896*a*, 1896*b* may store data (e.g., objects, instructions) that are utilized by one or more components of the processor, such as the cores 1074*a*, 1074*b* and 1084*a*, 1084*b*, respectively. For example, the shared cache 1896*a*, 1896*b* may locally cache data stored in a memory 1032, 1034 for faster access by components of the processor. In one or more embodiments, the shared cache 1896*a*, 1896*b* may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 5, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 5, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 5, various I/O devices 1014 (e.g., cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, network controllers/communication device(s) 1026 (which may in turn be in communication with a computer network), and a data storage unit 1019 such as a disk drive or other mass storage device which may include code 1030, in one embodiment. The code 1030 may include instructions for performing embodiments of one or more of the methods described above. Thus, the illustrated code 1030 may implement any or all components of the speech imitation system 10 (FIG. 1), any or all blocks of the method 50 (FIG. 2), and/or any or all blocks of the method 80 (FIG. 3), already discussed, and may be similar to the code 213 (FIG. 4), already discussed. Further, an audio I/O 1024 may be coupled to second bus 1020.

Note that other embodiments are contemplated. For example, instead of the point-to-point architecture of FIG. 5, a system may implement a multi-drop bus or another such communication topology. Also, the elements of FIG. 5 may alternatively be partitioned using more or fewer integrated chips than shown in FIG. 5. Moreover, the network controllers/communication device(s) 1026 may be implemented as a HFI (host fabric interface), also known as NIC (network interface card), that is integrated with one or more of the processing elements 1070, 1080 either on the same die, or in the same package.

ADDITIONAL NOTES AND EXAMPLES

Example 1 may include a computer system to imitate speech comprising a training data provider to provide training data including one or more of a machine learner to perform a first analysis of tagged data that is to be generated based on one or more of a speech pattern or a speech context behavior in media content and generate, based on the first analysis, a trained speech model that is to be applied to transform speech data to mimic data, or a data analyzer to perform a second analysis of one or more of the speech pattern, the speech context behavior, or the tagged data and generate, based on the second analysis, a programmed speech rule that is to be applied to transform the speech data to the mimic data, and a speech device to output imitated speech based on the mimic data.

Example 2 may include the system of Example 1, further including a speech pattern identifier to identify one or more of an ordered speech pattern, a literary point of view, or a disordered speech pattern in the media content, and a context behavior identifier to identify one or more of a trained behavior, a replacement behavior, or an additive behavior in the media content.

Example 3 may include the system of any one of Examples 1 to 2, further including a media content tagger to modify the media content with a speech pattern tag, and modify the media content with a speech context behavior tag.

Example 4 may include the system of any one of Examples 1 to 3, wherein the machine learner is to learn the speech pattern based on the speech pattern tag, and learn the speech context behavior based on the speech context behavior tag.

Example 5 may include the system of any one of Examples 1 to 4, further including a condition evaluator to determine a factor associated with one or more of a speech pattern or a speech context behavior, wherein the factor includes one or more of a usage frequency, a response trigger, or a bias.

Example 6 may include the system of any one of Examples 1 to 5, further including a user interface to provide a character input field for a configurable speech object value defining a speech object for which one or more of a selected speech pattern or a selected speech context behavior is to be applied, and provide a probability input field for a configurable probability value defining a rate at which one or more of the selected speech pattern, the selected context behavior, or a selected factor thereof is to be applied.

Example 7 may include the system of any one of Examples 1 to 6, further including a context mapper to evaluate a reference data set that includes characteristic speech for a speech object and one or more of a context of a characteristic response by the speech object or the characteristic response, and map, for an identified speech context behavior, one or more of a feature associated with the characteristic response, available speech data based on the characteristic response that is to be available to modify the audio data, or an identification of the speech object for which the available speech data is to be applied to generate the mimic data.

Example 8 may include the system of any one of Examples 1 to 7, further including a speech data modifier to modify the speech data to generate the mimic data based on one or more of the trained speech model or the programmed speech rule, wherein the mimic data includes one or more of text of the mimicked speech or a tag that is to instruct the speech device how to output the mimicked speech.

Example 9 may include an apparatus to imitate speech comprising a machine learner to perform a first analysis of tagged data that is to be generated based on one or more of a speech pattern or a speech context behavior in media content and generate, based on the first analysis, a trained speech model that is to be applied to transform speech data to mimic data, or a data analyzer to perform a second analysis of one or more of the speech pattern, the speech context behavior, or the tagged data and generate, based on the second analysis, a programmed speech rule that is to be applied to transform the speech data to the mimic data.

Example 10 may include the apparatus of Example 9, further including a speech pattern identifier to identify one or more of an ordered speech pattern, a literary point of view, or a disordered speech pattern in the media content, and a context behavior identifier to identify one or more of a trained behavior, a replacement behavior, or an additive behavior in the media content.

Example 11 may include the apparatus of any one of Examples 9 to 10, further including a media content tagger to modify the media content with a speech pattern tag, and modify the media content with a speech context behavior tag.

Example 12 may include the apparatus of any one of Examples 9 to 11, wherein the machine learner is to learn the speech pattern based on the speech pattern tag, and learn the speech context behavior based on the speech context behavior tag.

Example 13 may include the apparatus of any one of Examples 9 to 12, further including a condition evaluator to determine a factor associated with one or more of a speech pattern or a speech context behavior, wherein the factor includes one or more of a usage frequency, a response trigger, or a bias.

Example 14 may include the apparatus of any one of Examples 9 to 13, further including a user interface to provide a character input field for a configurable speech object value defining a speech object for which one or more of a selected speech pattern or a selected speech context behavior is to be applied, and provide a probability input field for a configurable probability value defining a rate at which one or more of the selected speech pattern, the selected context behavior, or a selected factor thereof is to be applied.

Example 15 may include the apparatus of any one of Examples 9 to 14, further including a context mapper to evaluate a reference data set that includes characteristic speech for a speech object and one or more of a context of a characteristic response by the speech object or the characteristic response, and map, for an identified speech context behavior, one or more of a feature associated with the characteristic response, available speech data based on the characteristic response that is to be available to modify the audio data, or an identification of the speech object for which the available speech data is to be applied to generate the mimic data.

Example 16 may include the apparatus of any one of Examples 9 to 15, further including a speech data modifier to modify the speech data to generate the mimic data based on one or more of the trained speech model or the programmed speech rule, wherein the mimic data includes one or more of text of the mimicked speech or a tag that is to instruct the speech device how to output the mimicked speech.

Example 17 may include at least one computer readable storage medium comprising a set of instructions which, when executed by a device, cause the device to perform a first analysis of tagged data that is to be generated based on one or more of a speech pattern or a speech context behavior in media content, and generate, based on the first analysis, a trained speech model that is to be applied to transform speech data to mimic data, or perform a second analysis of one or more of the speech pattern, the speech context behavior, or the tagged data, and generate, based on the second analysis, a programmed speech rule that is to be applied to transform the speech data to the mimic data.

Example 18 may include the at least one computer readable storage medium of Example 17, wherein the instructions, when executed, cause a device to identify one or more of an ordered speech pattern, a literary point of view, or a disordered speech pattern in the media content, and identify one or more of a trained behavior, a replacement behavior, or an additive behavior in the media content.

Example 19 may include the at least one computer readable storage medium of any one of Examples 17 to 18, wherein the instructions, when executed, cause a device to modify the media content with a speech pattern tag, and modify the media content with a speech context behavior tag.

Example 20 may include the at least one computer readable storage medium of any one of Examples 17 to 19, wherein the instructions, when executed, cause a device learn the speech pattern based on the speech pattern tag, and learn the speech context behavior based on the speech context behavior tag.

Example 21 may include the at least one computer readable storage medium of any one of Examples 17 to 20, wherein the instructions, when executed, cause a device to determine a factor associated with one or more of a speech pattern or a speech context behavior, wherein the factor includes one or more of a usage frequency, a response trigger, or a bias.

Example 22 may include the at least one computer readable storage medium of any one of Examples 17 to 21, wherein the instructions, when executed, cause a device to provide a character input field for a configurable speech object value defining a speech object for which one or more of a selected speech pattern or a selected speech context behavior is to be applied, and provide a probability input field for a configurable probability value defining a rate at which one or more of the selected speech pattern, the selected context behavior, or a selected factor thereof is to be applied.

Example 23 may include the at least one computer readable storage medium of any one of Examples 17 to 22, wherein the instructions, when executed, cause a device to evaluate a reference data set that includes characteristic speech for a speech object and one or more of a context of a characteristic response by the speech object or the characteristic response, and map, for an identified speech context behavior, one or more of a feature associated with the characteristic response, available speech data based on the characteristic response that is to be available to modify the audio data, or an identification of the speech object for which the available speech data is to be applied to generate the mimic data.

Example 24 may include the at least one computer readable storage medium of any one of Examples 17 to 23, wherein the instructions, when executed, cause a device to modify the speech data to generate the mimic data based on one or more of the trained speech model or the programmed speech rule, wherein the mimic data includes one or more of text of the mimicked speech or a tag that is to instruct the speech device how to output the mimicked speech.

Example 25 may include a method to imitate speech comprising performing a first analysis of tagged data that is generated based on one or more of a speech pattern or a speech context behavior in media content, and generating, based on the first analysis, a trained speech model that is to be applied to transform speech data to mimic data, or performing a second analysis of one or more of the speech pattern, the speech context behavior, or the tagged data, and generating, based on the second analysis, a programmed speech rule that is to be applied to transform the speech data to the mimic data.

Example 26 may include the method of Example 25, further including identifying one or more of an ordered speech pattern, a literary point of view, or a disordered speech pattern in the media content, and identifying one or more of a trained behavior, a replacement behavior, or an additive behavior in the media content.

Example 27 may include the method of any one of Examples 25 to 26, further including modifying the media content with a speech pattern tag, and modifying the media content with a speech context behavior tag.

Example 28 may include the method of any one of Examples 25 to 27, further including learning the speech pattern based on the speech pattern tag, and learning the speech context behavior based on the speech context behavior tag.

Example 29 may include the method of any one of Examples 25 to 28, further including determining a factor associated with one or more of a speech pattern or a speech context behavior, wherein the factor includes one or more of a usage frequency, a response trigger, or a bias.

Example 30 may include the method of any one of Examples 25 to 29, further including providing a character input field for a configurable speech object value defining a speech object for which one or more of a selected speech pattern or a selected speech context behavior is to be applied, and providing a probability input field for a configurable probability value defining a rate at which one or more of the selected speech pattern, the selected context behavior, or a selected factor thereof is to be applied.

Example 31 may include the method of any one of Examples 25 to 30, further including evaluating a reference data set that includes characteristic speech for a speech object and one or more of a context of a characteristic response by the speech object or the characteristic response, and mapping, for an identified speech context behavior, one or more of a feature associated with the characteristic response, available speech data based on the characteristic response that is to be available to modify the audio data, or an identification of the speech object for which the available speech data is to be applied to generate the mimic data.

Example 32 may include the method of any one of Examples 25 to 31, further including modifying the speech data to generate the mimic data based on one or more of the trained speech model or the programmed speech rule, wherein the mimic data includes one or more of text of the mimicked speech or a tag that is to instruct the speech device how to output the mimicked speech.

Example 33 may include an apparatus to imitate speech comprising means for performing the method of any one of Examples 25 to 32.

Thus, techniques described herein may provide trained ML/DL models and/or programmed rules to a support a broad range of speech patterns and/or speech context behaviors for a more human-like and/or character/personality specific response. For example, distinct speech patterns of popular characters can be mimicked such as Captain Kirk (Star Trek), Mater (Cars), Cookie Monster (Sesame Street), The Cat in the Hat (Dr. Suess), and so on. Techniques described herein may further provide a more realistic/human-like interaction with audio AIs for audio assistants, game AIs, educational content AIs, and/or social app AIs. For example, speech patterns and/or speech context behaviors that are not available with conventional response engines for audio AIs may be provided. Moreover, users may select from a range of "off-the-shelf personalities" and/or configure their audio AI to mimic "stereotyped" personality, fictional character personality, historical figure personality, celebrity personality, etc. In addition, content creators may develop custom character speech patterns (e.g., if they chose not to mimic a specific character/personality) for their response AI.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C. In addition, a list of items joined by the term "and so on" or "etc." may mean any combination of the listed terms as well any combination with other terms.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

I claim:

1. A computer system comprising:

a training data provider to provide training data and generate one or more of a trained speech model or a programmed speech rule, wherein the one or more of the trained speech model or the programmed speech rule are to be applied to transform speech data to mimic data, and the training data provider includes a condition evaluator to determine a factor associated with one or more of a speech pattern or a speech context behavior, wherein the factor is to include one or more of a usage frequency, a response trigger, or a bias, and one or more of a machine learner to:

perform a machine learning analysis of tagged data that is to be generated based on one or more of a speech pattern or a speech context behavior in media content; and generate, based on the machine learning analysis, the trained speech model that is to be applied to transform the speech data to the mimic data, or a data analyzer to:

perform a data analysis of one or more of a speech pattern, a speech context behavior, or tagged data; and generate, based on the data analysis, the programmed speech rule that is to be applied to transform the speech data to the mimic data; and a speech device to output imitated speech based on the mimic data.

2. The system of claim 1, further including:

a speech pattern identifier to identify one or more of an ordered speech pattern, a literary point of view, or a disordered speech pattern in the media content; and a context behavior identifier to identify one or more of a trained behavior, a replacement behavior, or an additive behavior in the media content.

3. The system of claim 1, further including a media content tagger to:

modify the media content with a speech pattern tag; and modify the media content with a speech context behavior tag.

4. The system of claim 3, wherein the machine learner is to:

learn the speech pattern, associated with the machine learning analysis, based on the speech pattern tag; and learn the speech context behavior, associated with the machine learning analysis, based on the speech context behavior tag.

5. The system of claim 1, wherein the factor includes the usage frequency, the response trigger, and the bias.

6. The system of claim 1, further including a user interface to:

provide a character input field for a configurable speech object value defining a speech object for which one or more of a selected speech pattern or a selected speech context behavior is to be applied; and provide a probability input field for a configurable probability value defining a rate at which one or more of the selected speech pattern, the selected speech context behavior, or a selected factor thereof is to be applied.

7. The system of claim 1, wherein the training data provider further includes a context mapper to:

evaluate a reference data set that includes characteristic speech for a speech object and one or more of a context of a characteristic response by the speech object or the characteristic response, and map, for an identified speech context behavior, one or more of a feature associated with the characteristic response, available speech data based on the characteristic response that is to be available to modify audio data, or an identification of the speech object for which the available speech data is to be applied to generate the mimic data.

8. The system of claim 1, wherein the training data provider further includes a speech data modifier to modify the speech data to generate the mimic data based on one or more of the trained speech model or the programmed speech rule, wherein the mimic data includes one or more of text of the mimicked speech or a tag that is to instruct the speech device how to output the mimicked speech.

9. An apparatus comprising:

a training data provider to generate one or more of a trained speech model or a programmed speech rule, wherein the one or more of the trained speech model or the programmed speech rule are to be applied to transform speech data to mimic data, and the training data provider includes a condition evaluator to determine a factor associated with one or more of a speech pattern or a speech context behavior, wherein the factor is to include one or more of a usage frequency, a response trigger, or a bias; and one or more of a machine learner to:

perform a machine learning analysis of tagged data that is to be generated based on one or more of a speech pattern or a speech context behavior in media content; and generate, based on the machine learning analysis, the trained speech model that is to be applied to transform the speech data to the mimic data; or a data analyzer to:

perform a data analysis of one or more of a speech pattern, a speech context behavior, or tagged data; and generate, based on the data analysis, the programmed speech rule that is to be applied to transform the speech data to the mimic data.

10. The apparatus of claim 9, further including:

a speech pattern identifier to identify one or more of an ordered speech pattern, a literary point of view, or a disordered speech pattern in the media content; and a context behavior identifier to identify one or more of a trained behavior, a replacement behavior, or an additive behavior in the media content.

11. The apparatus of claim 9, further including a media content tagger to:

modify the media content with a speech pattern tag; and modify the media content with a speech context behavior tag.

12. The apparatus of claim 11, wherein the machine learner is to:

learn the speech pattern, associated with the machine learning analysis, based on the speech pattern tag; and learn the speech context behavior, associated with the machine learning analysis, based on the speech context behavior tag.

13. The apparatus of claim 9, wherein the factor includes the usage frequency, the response trigger, and the bias.

14. The apparatus of claim 9, further including a user interface to:

provide a character input field for a configurable speech object value defining a speech object for which one or more of a selected speech pattern or a selected speech context behavior is to be applied; and provide a probability input field for a configurable probability value defining a rate at which one or more of the selected speech pattern, the selected speech context behavior, or a selected factor thereof is to be applied.

15. The apparatus of claim 9, wherein the training data provider further includes a context mapper to:

evaluate a reference data set that includes characteristic speech for a speech object and one or more of a context of a characteristic response by the speech object or the characteristic response; and map, for an identified speech context behavior, one or more of a feature associated with the characteristic response, available speech data based on the characteristic response that is to be available to modify audio data, or an identification of the speech object for which the available speech data is to be applied to generate the mimic data.

16. The apparatus of claim 9, wherein the training data provider further includes a speech data modifier to modify the speech data to generate the mimic data based on one or more of the trained speech model or the programmed speech rule, wherein the mimic data includes one or more of text of the mimicked speech or a tag that is to instruct a speech device how to output the mimicked speech.

17. At least one non-transitory computer readable storage medium comprising a set of instructions which, when executed by a device, cause the device to:

generate one or more of a trained speech model or a programmed speech rule, wherein the one or more of the trained speech model or the programmed speech rule are to be applied to transform speech data to mimic data;

determine a factor associated with one or more of a speech pattern or a speech context behavior, wherein the factor is to include one or more of a usage frequency, a response trigger, or a bias; and one or more of perform a machine learning analysis of tagged data that is to be generated based on one or more of a speech pattern or a speech context behavior in media content, and generate, based on the machine learning analysis, the trained speech model that is to be applied to transform the speech data to the mimic data; or perform a data analysis of one or more of a speech pattern, a speech context behavior, or tagged data, and generate, based on the data analysis, the programmed speech rule that is to be applied to transform the speech data to the mimic data.

18. The at least one non-transitory computer readable storage medium of claim 17, wherein the instructions, when executed, cause a device to:

modify the media content with a speech pattern tag; and modify the media content with a speech context behavior tag.

19. The at least one non-transitory computer readable storage medium of claim 17, wherein the factor includes the usage frequency, the response trigger, and the bias.

20. The at least one non-transitory computer readable storage medium of claim 17, wherein the instructions, when executed, cause a device to:

provide a character input field for a configurable speech object value defining a speech object for which one or more of a selected speech pattern or a selected speech context behavior is to be applied; and provide a probability input field for a configurable probability value defining a rate at which one or more of the selected speech pattern, the selected speech context behavior, or a selected factor thereof is to be applied.

21. The at least one non-transitory computer readable storage medium of claim 17, wherein the instructions, when executed, cause a device to:

evaluate a reference data set that includes characteristic speech for a speech object and one or more of a context of a characteristic response by the speech object or the characteristic response; and map, for an identified speech context behavior, one or more of a feature associated with the characteristic response, available speech data based on the characteristic response that is to be available to modify audio data, or an identification of the speech object for which the available speech data is to be applied to generate the mimic data.

22. The at least one non-transitory computer readable storage medium of claim 17, wherein the instructions, when executed, cause a device to modify the speech data to generate the mimic data based on one or more of the trained speech model or the programmed speech rule, wherein the mimic data includes one or more of text of the mimicked speech or a tag that is to instruct a speech device how to output the mimicked speech.

23. A method comprising:

generating one or more of a trained speech model or a programmed speech rule, wherein the one or more of the trained speech model or the programmed speech rule are to be applied to transform speech data to mimic data;

determining a factor associated with one or more of a speech pattern or a speech context behavior, wherein the factor is to include one or more of a usage frequency, a response trigger, or a bias; and one or more of performing a machine learning analysis of tagged data that is generated based on one or more of a speech pattern or a speech context behavior in media content, and generating, based on the machine learning analysis, the trained speech model that is to be applied to transform the speech data to the mimic data; or performing a data analysis of one or more of a speech pattern, a speech context behavior, or tagged data, and generating, based on the data analysis, the programmed speech rule that is to be applied to transform the speech data to the mimic data.

24. The method of claim 23, further including:

modifying the media content with a speech pattern tag; and modifying the media content with a speech context behavior tag.

25. The method of claim 23, further including modifying the speech data to generate the mimic data based on one or more of the trained speech model or the programmed speech rule, wherein the mimic data includes one or more of text of the mimicked speech or a tag that is to instruct a speech device how to output the mimicked speech.

* * * * *